(No Model.)
G. A. KROHN.
TIRE TIGHTENER.
No. 567,397. Patented Sept. 8, 1896.
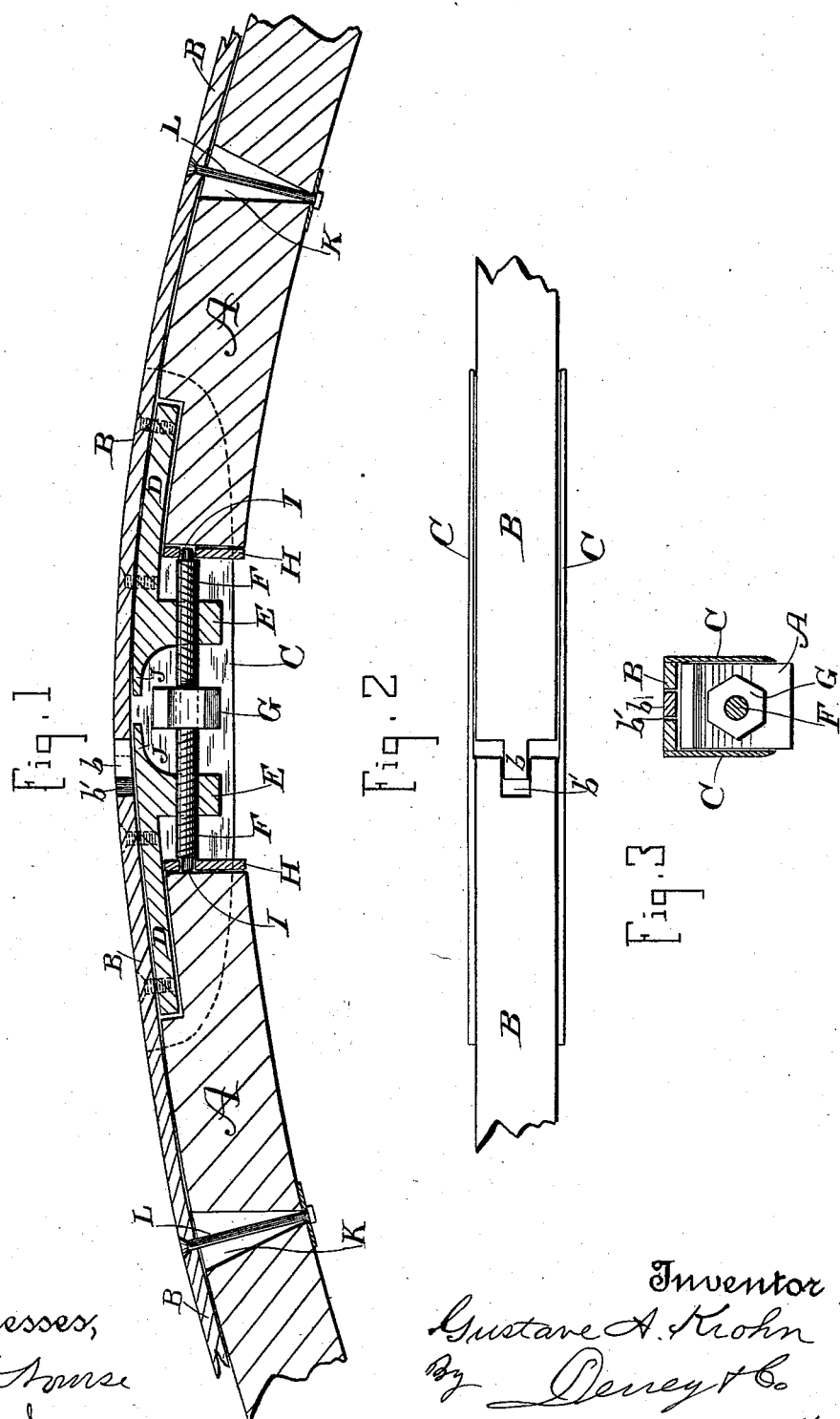
Witnesses,
Inventor,
Gustave A. Krohn
By Dewey & Co.
Attys

UNITED STATES PATENT OFFICE.

GUSTAVE A. KROHN, OF GOLD GULCH, CALIFORNIA, ASSIGNOR OF ONE-FOURTH TO CHARLES MELVIN AND DUNCAN McLELLAN, OF SAME PLACE.

TIRE-TIGHTENER.

SPECIFICATION forming part of Letters Patent No. 567,397, dated September 8, 1896.

Application filed October 16, 1895. Serial No. 565,898. (No model.)

*To all whom it may concern:*

Be it known that I, GUSTAVE A. KROHN, a citizen of the United States, residing at Gold Gulch, county of Madera, State of California, have invented an Improvement in Tire-Tighteners; and I hereby declare the following to be a full, clear, and exact description of the same.

My invention relates to a device for tightening the iron tires upon wooden or other wheels when they become slack or loose without changing or disturbing the other parts of the wheel itself, so as to either loosen the spokes in the fellies or change the dish of the wheel or otherwise affect it.

It consists in certain details of construction which will be more fully explained by reference to the accompanying drawings, in which—

Figure 1 is a sectional view of a part of the wheel, showing my device. Fig. 2 is a plan view showing the interlocking of the meeting ends of the tire. Fig. 3 is a cross-section.

A is the felly of a wheel, which in the present case is illustrated as made of wood, and the adjacent meeting ends at the point where my adjusting device is to be used are separated a distance sufficient to admit of this device.

B is the tire, which in the present case is shown as made of steel or iron, the ends being separated, one of said ends having a tongue $b$ which is adapted to fit into a corresponding channel $b'$ which is cut out of the opposing end of the tire, so that the tongue lies within the channel, and when the parts are in proper position it assists to prevent any side motion of the ends of the tire, but allows sufficient end movement for adjustment. Each of these ends of the tire B is secured between box-shaped casings C, which are preferably made of thin sheet metal and extend down on each side of the felly and back to a short distance from the adjacent separated ends thereof.

In order to properly secure the tires and to arrange my adjusting device, I have shown plates D, which are of a width sufficient to extend between the side plates C and fit into cut-away portions of the fellies, these cut-away portions being of sufficient depth to admit the plates D between the felly and the tire. These plates extend to a point within three-eighths of an inch of each other, and they have connected with or formed on their inner ends the thickened portions E, forming nuts which are screw-threaded to receive the screws F. These screws have their threads made right and left, and intermediate between the nuts E is fixed a polygonal head G, upon which a suitable wrench may be applied to turn the screw. The outer ends of these screws abut against metal plates H which are fitted against the ends of the fellies, and these plates have holes made through them, and corresponding projecting pins I from the ends of the screws enter these holes and serve as guides to steady the screws and plates H with relation to each other. These parts are inclosed on the sides by the plates C, before described, which are movable with the tire B and the plates D and nuts E to which they are secured.

The operation will then be as follows: When the wheel is set up and the proper dish given, the screws F will abut against the plates H which cover the ends of the fellies, and thus form a solid connection between the felly ends. The tire being firmly attached to the plates D and the nuts E, the screws F passing through these nuts, by turning the intermediate head G the nuts E are drawn toward each other, carrying with them the plates D and the side plates C and the tires B, which are secured to the plates D. The length of the tongue $b$ and channel $b'$ in the tire is sufficient to allow of necessary adjustment in drawing the parts together. This overlap or joint of the tire is preferably made at one side of the space intermediate between the nuts E and E. The outer parts of the nuts upon which the tire rests are curved and extended toward each other, as shown at J, or they may overlap, so as to close the space between them as much as possible. It will be seen by this construction that the turning of the screws F simply rotates them between the ends of the fellies, which are not moved from the position to which they are originally set, but the nuts E E will be advanced upon the screws, and by their connection through the plates D with the ends of the tire B will draw these nuts and the ends of the tire toward each other with any desired degree of force, thus setting them as tight as may be desired without any alteration in the position of the other parts of the wheel, which is important, as it prevents any loosening of joints or change in the dish or shape of the wheel. In order to allow of this movement of the tires upon the felly, I have shown the holes K, through which the bolts L pass to secure the tire to the felly, as being made slightly oblong or preferably conical, with the inner end of the opening of just sufficient diameter to admit the bolt and the outer end long enough to allow the bolt to move slightly as the tire is drawn up. This allows for gradual adjustment without any necessity for changing the bolt-holes.

Having thus described my invention, what I claim as new, and desire to secure by Letters Patent, is—

An improved tire-tightener consisting of a felly having separated ends with the upper faces thereof recessed, perforated metal plates fitting against the felly ends, a right and left threaded screw having reduced ends, forming journals which are turnable in the perforations of the plates and shoulders which abut against said plates, and forming a rigid connection to prevent the approach of the felly ends, a tire having separated ends with a groove formed in one of said ends and a corresponding tongue fitting therein from the other, depending plates secured to the tire and inclosing the sides only of the felly ends, and movable with said tire, plates secured to the under side of the tire ends and adapted to fit the recessed portions of the felly-sections, and having nuts through which the screw passes, and bolts for securing the felly said bolts passing through inwardly-converging holes in the felly and movable with relation thereto, all constructed, combined and arranged to operate, as herein described.

In witness whereof I have hereunto set my hand.

GUSTAVE A. KROHN.

Witnesses:
S. H. NOURSE,
JESSIE C. BRODIE.